(12) United States Patent
Hurzeler

(10) Patent No.: US 7,080,019 B1
(45) Date of Patent: Jul. 18, 2006

(54) RIDE SHARE CONTACT SYSTEM

(75) Inventor: Philip Hurzeler, Newburyport, MA (US)

(73) Assignee: DuckTrip, LLC, Newburyport, MA (US)

( * ) Notice: Subject to any disclaimer, the term of this patent is extended or adjusted under 35 U.S.C. 154(b) by 1118 days.

(21) Appl. No.: 09/681,241

(22) Filed: Mar. 4, 2001

(51) Int. Cl.
*G06Q 50/00* (2006.01)

(52) U.S. Cl. ............................................... 705/1; 705/6
(58) Field of Classification Search .................. None
See application file for complete search history.

(56) References Cited

U.S. PATENT DOCUMENTS 4,360,875 A * 11/1982 Behnke ................... 455/456.5
6,751,584 B1 * 6/2004 Bangalore et al. ............. 704/1

FOREIGN PATENT DOCUMENTS

JP   2003186959 A  *  7/2003

OTHER PUBLICATIONS

Ride Share Online, web page, Feb. 1, 2001, entire document.*
Dateable.com, web page, Dec. 14, 1999, entire document.*

* cited by examiner

*Primary Examiner*—John G. Weiss
*Assistant Examiner*—Michael J. Fisher

(57) ABSTRACT

A method is disclosed which enables travelers to discover other travelers with similar and compatible travel plans, for purposes of contacting them and negotiating shared travel agreements. Travel plans are characterized quantitatively, enabling numerical measurement of the match between a pair of plans. Dependence upon similarity of place names is eliminated. The temporal difference between plans is converted to an equivalent distance difference and summed with the origin and destination differences to yield a single number ranking the match. Plans are ordered by this ranking against a search specification. The method is more compatible than the prior art with computer automation, and is accessible via the Internet.

7 Claims, 11 Drawing Sheets

Trip Criteria

Trip To Begin At: ← 2-1

Time and Date: 3/2/00 8:00 am

Leaving From: ← 2-2

ZIP Code: 01950

You can get ZIP codes from www.usps.gov

Destination: ← 2-3

ZIP Code: 06105

Look For Matches — 2-4
Post My Trip — 2-5

| Time Diff | Lv Pt Miles Diff | Dest Miles Diff | Special Cond |
|---|---|---|---|
| | | | |

Exit — 2-6

Figure 2

Trip Criteria

Trip To Begin At:
Time and Date  3/2/00 8:00 am  ← 2-1

Leaving From:
ZIP Code:
01950    You can get ZIP codes from www.usps.gov.
← 2-2

Destination:
ZIP Code:
06105    ← 2-3

[Look For Matches] — 2-4    [Post My Trip] — 2-5    3-1

| Time Diff | Lv Pt Miles Diff | Dest Miles Diff | Special Cond |
|---|---|---|---|
| 1.08 Days | 19.8 | 2.3 | No |
| 3.00 Days | 2.9 | 0. | No |
| 1.01 Months | 0. | 9.6 | No |

3-2 — [See Details]    [Exit] — 2-6

Figure 3 eWeGo Posted Traveling Plan

To Leave 3/5/2000 8:00 am  ——— 6-1

OK to Use Your Vehicle
I Can Drive
You May Drive ⬅——— 6-2
Travel Method: Car
No Smoking Please
Trip Notes: Going to Flower Show at the Civic Center
Starting Location
    Zip Code: 01952 ⬅——— 6-3
    Newbury MA
    Latitude   42.850432   Longitude   -70.858515

Destination
    Zip Code: 06105 ⬅——— 6-4
    Hartford CT
    Latitude:   41.7694   Longitude:   -72.7015

Person Who Posted This Trip
    Name: Pat Hurzeler ⬅——— 6-5
        Newburyport
        01950
    Phone 978-465-0697   EMail ph@computer.org   MA
    About Me: Adult Ed Student

Figure 6

Enter/Update Registration Info — 7-1

☐ I have a car (vehicle)  ☑ I Can Drive
☑ We can use your vehicle  ☑ You may drive or share driving
☑ No Smoking. Please  ☐ Parcel Only; No Passenger
☐ I Smoke  ☐ Same Time Many Days (commute)
☐ Deliver my vehicle, I'm  Travel Method: Car
  not coming 7-2

Airplane
Any
Boat
Car
Motorcycle
Other
Skiing
Walking

Notes:

Remove This Posting After: 3/2/2000 8

Post This Trip to eWeGo    Back to 7-3    7-4

Figure 7

RIDE SHARE CONTACT SYSTEM

BACKGROUND OF INVENTION

1. Field of the Invention

This invention relates to a method whereby travelers can find and contact other travelers with similar and compatible travel plans in order to negotiate agreements to travel together.

2. Description of the Prior Art

The current state of the art in ride share systems includes bulletin boards such as college "ride boards", batch processed match systems for car pooling, Internet chat rooms or discussion groups, and Web-based contact systems. In addition, two U.S. patents for public transportation systems include subsystems for matching riders with available vehicles.

Most of these systems cannot work with arbitrary geographic locations. For instance, commuter carpooling services work only in predefined metropolitan areas. College "ride boards" are similarly each tied to a particular campus. Some websites associated with specific events such as a concerts or conventions also promote ridesharing among attendees.

U.S. Pat. No. 4,360,875 to Behnke (1982) discloses a public transportation system that matches ride requests with ride offers within predefined geographical limits defined within a rectangular grid created for this purpose. U.S. Pat. No. 5,168,451 to Bolger (1992) discloses a transit system that similarly dispatches vehicles selected with the help of a predefined comprehensive matrix of all possible origins and destinations. U.S. Pat. No. 6,035,289 to Chou, Garg, and Yeh describes a method for matching carrier cargo capacities selected by time and capacity feasibility criteria and ranked by price. All of these patented systems limit origins and destinations to a predefined grid created as part of the patented system.

Rideshare systems not tied to specific locations suffer from the limitation of not being automatic. Users must manually scan through a lists and make comparisons. Not only is this tedious, but mistakes occur. A traveler from New York City to Washington D.C. for example, may fail to recognize the potential match with another traveler from Brooklyn, N.Y. to Vienna, Va. Examples of such systems include classified advertising in newspapers or other periodicals, online forums or "chat rooms", and storefront operations such as Allostop in Canada (see http://www.allostop.com/english/default.htm).

Attempts to overcome these problems have resulted in interactive Websites using zones or grids like the cited patented systems. These designs suffer from the dilemma that a coarse-grained grid offers poor matching precision while a fine-grained grid requires a significant manual effort. Further, potential matches go unrecognized when candidate and target origins or destinations happen to straddle grid boundaries. Examples of these systems are at http://www.rideboard.com, http://shareride.com, http://www.campuswired.com, http://www.union.uiuc.edu/rb, http://www.rejsecenter.net/klik/europa, http://www.karpool.com, and http://www.mainquad.com/htmis/worp/DEADJOE These problems limit the number of travel plans that clients will post to a database, which in turn reduces the likelihood that other clients will find matches. This recursive "critical mass" phenomenon has further limited the success of ride sharing despite is considerable inherent advantages.

SUMMARY OF INVENTION

Posting users specify proposed travel plans in a quantitative format and post them in a database for viewing by other users called Browsing users. A Browsing User similarly states his or her own traveling plans in order to find closely matching posted plans. The quantitative format, which is lacking in the prior art, enables computation of a rank of match between the Browser's plan and each posted plan, and listing of the posted plans in order of this rank. This new system always lists potentially matching plans, unlike the selection systems of the prior art which often yield empty lists.

In one aspect of the invention, the origin and destination are specified in terms of geographic locations, such as latitude and longitude.

In another aspect of the Invention, the origin and destination are specified in terms of postal codes such as ZIP codes in the United States, which in turn are used to determine approximations to the respective geographic locations.

The ranking is computed as the sum of:

The Great Circle Distance between the Poster's and Browser's origins,

The Great Circle Distance between the respective destinations, and

The difference in departure times multiplied by a weighting factor which converts it to an equivalent distance.

In another aspect of the Invention, the origins and destinations are specified on a map, and measured distances on the map are used instead of Great Circle distances to compute the ranking.

In another aspect of the invention, the Browsing user can select any plan and view further details upon which to base a final choice. Thereafter he or she may gain access to contact information with which to establish communications with the associated Posting user in order to negotiate a shared travel agreement.

In another aspect of the invention, additional travel plan specifications beyond the basic origin, destination, and travel time can be optionally included by the Posting user and used as matching criteria by the Browsing user. Some example supplementary specifications are:

Whether the Posting user has a vehicle available.

Whether the Posting user is willing and able to share driving chores.

The preferred vehicle type, such as automobile, airplane, bicycle, feet, or skis.

Whether cargo is meant to be transported.

Whether the Posting user intends personal travel, as opposed to only sending cargo and/or a vehicle for delivery by the other user.

Whether the posted travel time is a deadline after which the travel may not commence.

Whether the travel may not commence until after the posted travel time.

Compatibility characteristics of the Posting user, such as whether he or she smokes or can tolerate smoking companions.

As indicated by the foregoing, the term "travel" can connote personal trips, group travel in a chartered large vehicle, cargo shipment, and/or vehicle delivery. Each of these additional travel plan specifications can be either 1) applied as screening criteria during the automatic ranking process, or 2) comprise part of the further details manually reviewed by the Browsing user before making a final choice.

In another aspect of the invention, contact information for Posting users can be withheld from the Browsing user until he or she makes a final choice and provides some consideration such as a payment in order to gain access to the associated contact information.

OBJECTS

It is an object of my Invention to enable travelers with similar and compatible travel plans to easily discover each other in order to negotiate shared travel agreements.

It is a further object of my Invention to enable travelers lacking a vehicle to contact others with compatible plans having a suitable vehicle.

It is a further object of my Invention to enable travelers with unused vehicle carrying capacity to contact others who might use that capacity.

It is a further object of my Invention to provide useful information to travelers to places and at times not addressed by the schedules of public transportation carriers.

It is a further object of my Invention to conserve resources and minimize the adverse ecological impact of the growing volume of travel.

Advantages

Accordingly, several advantages of my invention are:

Extreme flexibility with the ability to process travel plan specifications having arbitrary locations and times. "Anytime, anywhere".

The ability to recognize nearby locations despite any mismatch in their descriptive names, such as city and state names.

Automatic ranking, for rapid processing even with a large database.

Consequent to the foregoing, more plans in the database and an increased likelihood of finding a satisfactory plan in the database.

The ability to optionally use the matching algorithm of the prior art, namely filtering on qualitative attributes, in addition to the new matching algorithm namely sorting on quantitative attributes.

Ride sharing combines the flexibility of private transportation with the economy and resource conservation of public transportation. A travel matching system can have significant economic and ecological impact if it is more flexible and efficient than the prior art. The 1995 Nationwide Personal Transportation Survey reported an average of 896 million trips in personally owned vehicles per day. In two thirds of these vehicles, there was but a single occupant. Even if only a small percentage of these empty seats were to be filled, savings commensurate with those sought by public transportation planners would be achieved.

Further objects and advantages of my invention will become apparent from a consideration of the drawings and ensuing description.

BRIEF DESCRIPTION OF DRAWINGS

FIG. 2. Shows a Web page displaying a posted travel plan.

FIG. 3. Same as FIG. 2, showing matching travel plans after the "Look For Matches" button 2-4 has been activated and the second plan in the list has been selected or highlighted.

FIG. 6. Shows the Web page invoked by activating the "See Details" button of FIG. 3, and which displays further details of the selected travel plan.

FIG. 7. Shows the Web page invoked by activating the "Post My Trip" button 3-2. When the "Post This Trip to eWeGo" button 2-5 is activated, the travel plan specified on this page and on FIG. 2 is posted to the database.

LIST OF REFERENCE NUMERALS

Figure 1:
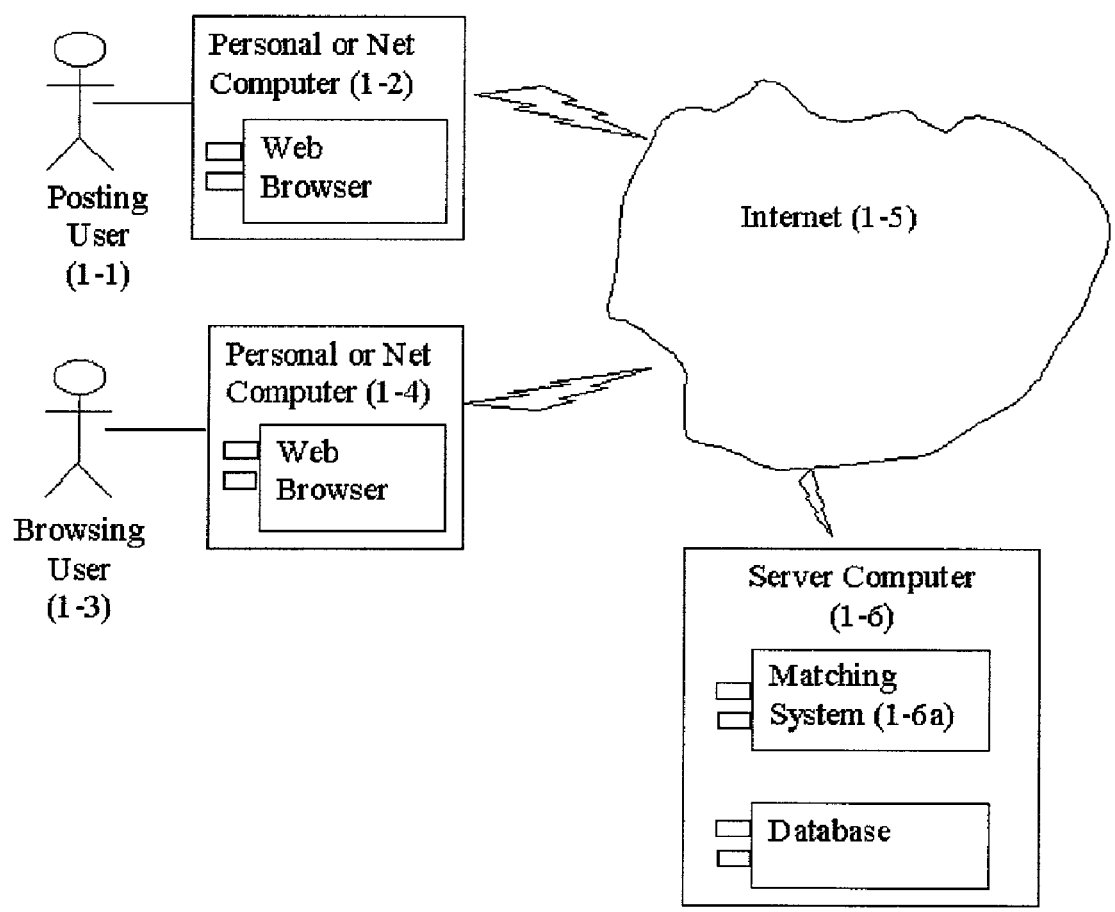
FIG. 1. Shows that a number of users, each at a different time and location, can use the Internet or other network to post or browse the server database.

10-1 Distance between origin locations of a pair of travel plans.

10-2 Distance between destination locations of a pair of travel plans.

11-1 Desired location for which a quantitative description is not readily available.

11-2 Post Office location having a readily available quantitative description.

11-3 Zip Code containing the desired location 11-1 and characterized by the Post Office location 11-2.

4-1 Origin and travel time of the earlier of two travel plans being compared.

4-2 Origin and travel time of the later of two travel plans being compared.

4-3 Time difference between two travel plans being compared.

4-4 Origin or destination difference between two travel plans being compared.

5-1 Distance equivalent of the time difference 4-3 between two travel plans being compared.

5-2 Origin and travel time equivalent to 4-2.

12-1 Net quantitative difference between two travel plans.

1-1 Posting User who posts a traveling plan.

1-2 Computer or terminal device used by a Posting User.

1-3 Browsing User, who looks among the posted travel plans.

1-4 Computer or terminal device used by a Browsing User.

1-5 Internet and World Wide Web, or other network.

1-6 Server Computer embodying this Invention.

2-1 Specification of desired travel time.

2-2 Specification of desired travel origin.

2-3 Specification of desired travel destination.

2-4 Command button to initiate a search for posted plans in the database ranked by match the search specification.

2-5 Command button to post the specified travel plan to the database.

2-6 Command button to close the current page and discard the search result.

3-1 Results of the search among posted travel plans.

3-2 Command button to view additional details for a selected result in 3-1.

6-1 Browsers view of Poster's specification of selected plan time.

6-2 Browser's view of Poster's specification of selected plan additional details.

6-3 Browser's view of Poster's specification of selected plan origin.

6-4 Browser's view of Poster's specification of selected plan destination.

6-5 Browser's view of Poster's self-description including contact information.

7-1 Command button enabling Poster to go to a Web page dedicated to updating his or her self-description including contact information.

7-2 Several elements on the Web page by which the Poster can specify additional travel plan details.

7-3 Command button for posting the fully specified travel plan to the database.

7-4 Command button for abandoning the Posting operation by closing the page and going back to the Search page.

8-1 Column containing user interactions with the system.

8-2 Column containing system interactions with the user.

8-3 Step wherein the user inputs specifications for a desired travel plan.

8-4 Step wherein the system finds matching travel plans and orders them by rank of match to the specification.

8-5 Step wherein the user decides whether any of the listed plans is satisfactory.

8-6 Step wherein the user selects a travel plan.

8-7 Step wherein the user supplies additional specifications so that his or her desired travel plan can be posted to the database.

8-8 Step wherein the system retrieves all available data for the user-selected plan.

8-9 State wherein the user has all data for the selected travel plan and may contact the Posting user.

8-10 Step wherein the system posts the desired travel plan to the database.

8-11 State wherein the desired travel plan has been posted to the database so that the user may expect a call from an interested party at any time.

DETAILED DESCRIPTION

Figure 10:
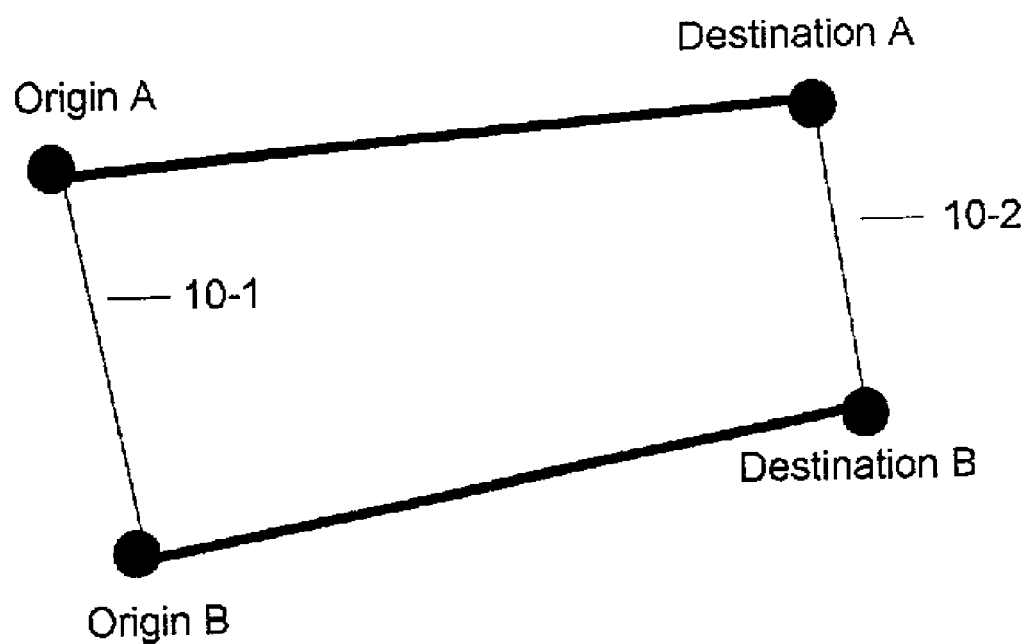
FIG. 10. Shows the origin and destination differences in a comparison between two travel plans.

Comparison between any pair of travel plans begins with the differences between origins and destinations. FIG. 10 shows the difference 10-1 between a pair of origins and the difference 10-2 between a pair of destinations. The disparity between the plans is proportional to each of the distances 10-1 and 10-2.

Figure 11:
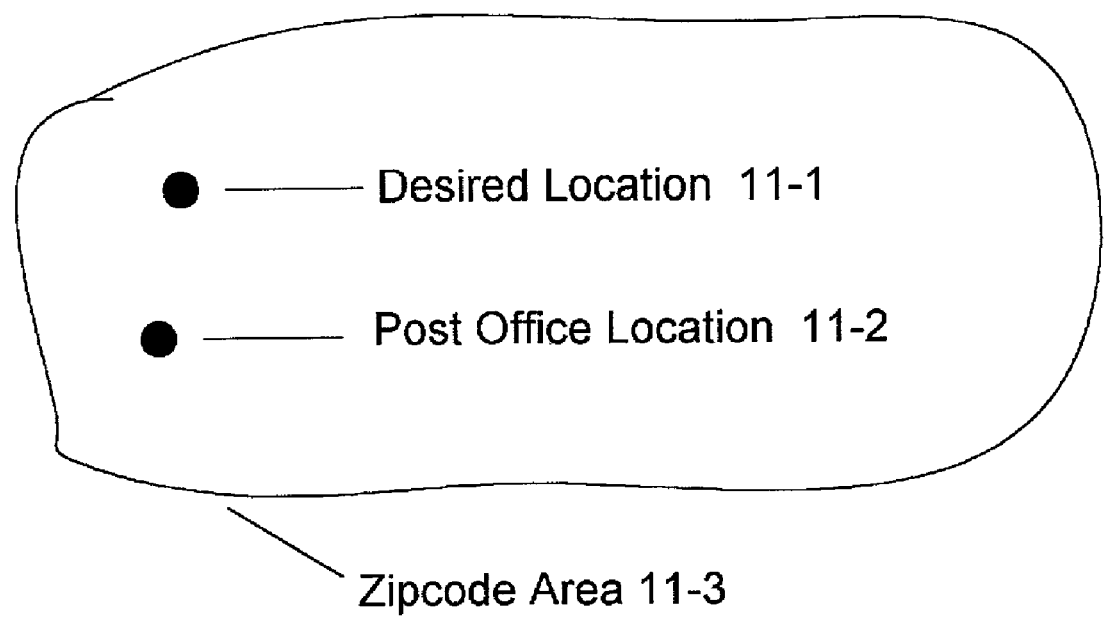
FIG. 11. Shows how a Zip code can be used to approximate the quantitative characterization of a location.

As illustrated in FIG. 11, if a quantitative characterization of either an origin or destination location 11-1 is unavailable it can be approximated in terms of its Zip Code or postal code. Both the containing Zip Code and a precise quantitative characterization of the associated post office's location are readily available anywhere in the U.S. and many places elsewhere.

The difference between the requested time and the time of each travel plan posted in the database can be converted into an equivalent distance by multiplication with an assumed traveling speed. In this way the dimensional unit of time is converted to distance, the same dimensional unit as that of the origin and destination differences.

Figure 4:
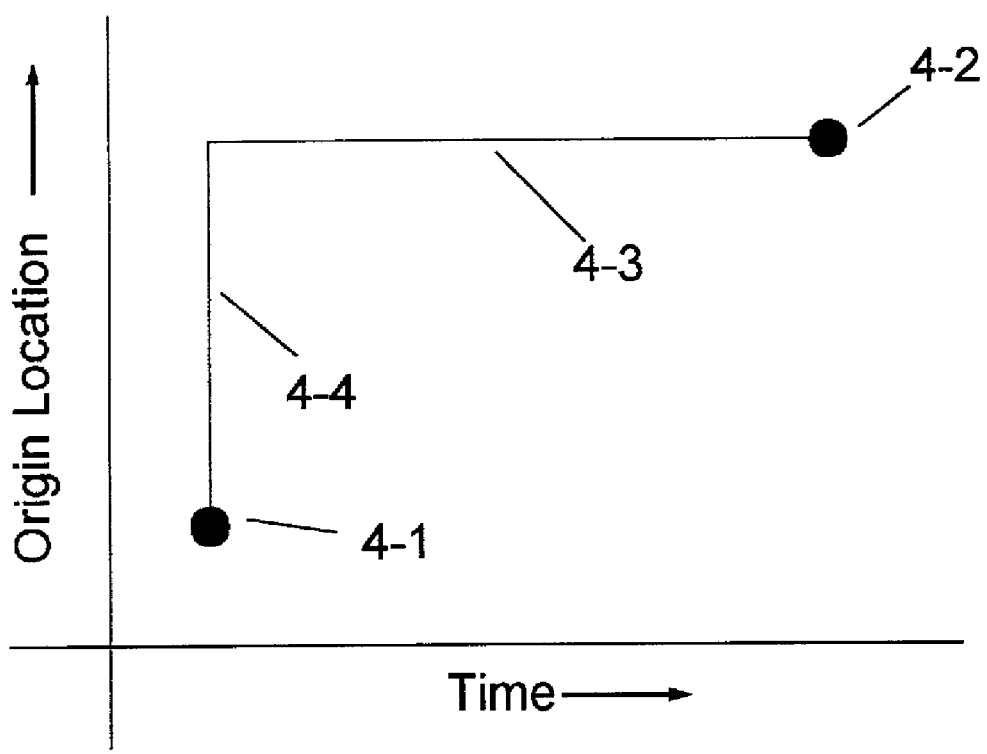
FIG. 4. Shows a plot of the planned origins and travel times of two travelers who must negotiate the plan differences in order to travel together.
Figure 5:
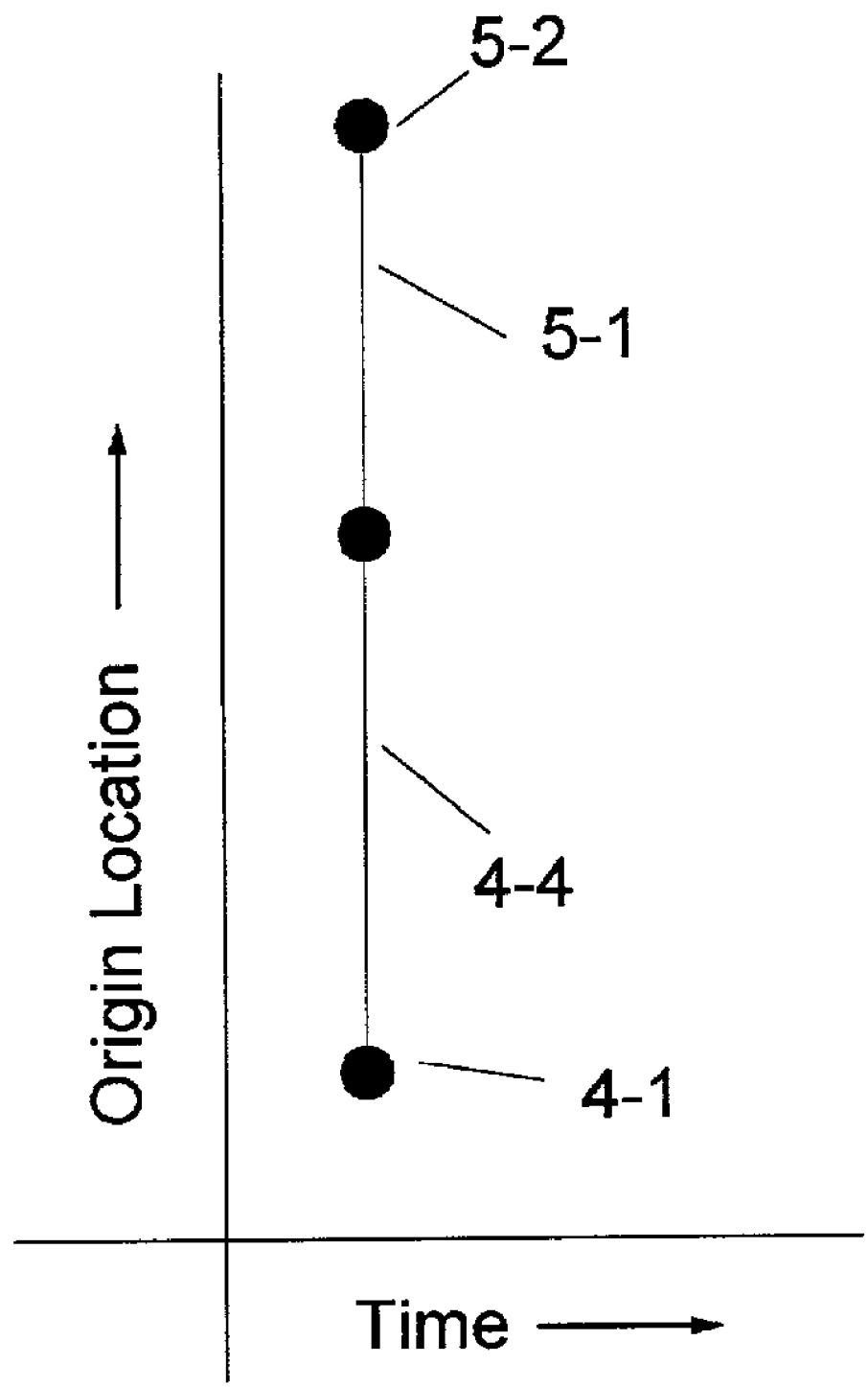
FIG. 5. Illustrates how the effective origin difference in FIG. 4 is increased if the later traveler adjusts his or her travel time to match that of the earlier traveler.

The rationale for this conversion follows. If the earlier traveler whose origin and time are shown at the point 4-1 in FIG. 4 makes no compromises, the later traveler must move the departure time shown at point 4-2 forward by the amount 4-3 and furthermore must journey the distance 4-4 to meet the earlier traveler at the origin 4-1. These concessions made by the later traveler are virtually the same as if his or her plan were that shown in FIG. 5 at point 5-2, where his or her travel time coincides with the earlier time, but the origin difference is increased by the distance 5-1 and the time spent covering this distance increase is the same as the original time difference. The amount of the distance increase 5-1 can be estimated as the product of the original time difference and a predetermined estimate of the later traveler's speed to make up this distance increase. In the more general case where each traveler makes a partial compromise, the rationale is that the total time spent by both travelers would remain unchanged, were the travel times to be artificially made identical but the origin difference were to be increased by an amount equal to the time difference multiplied by the average speed at which the travelers make up the increase.

A specific travel speed for each anticipated travel mode and vehicle type can be estimated and predetermined based upon published data, applicable laws such as Posted speed limits, and personal observations. Absent any specification of a travel mode or vehicle type in a travel plan, the most common mode and type, namely automobile, and its estimated average speed, currently 30 miles per hour, can reasonably be assumed.

Figure 12:
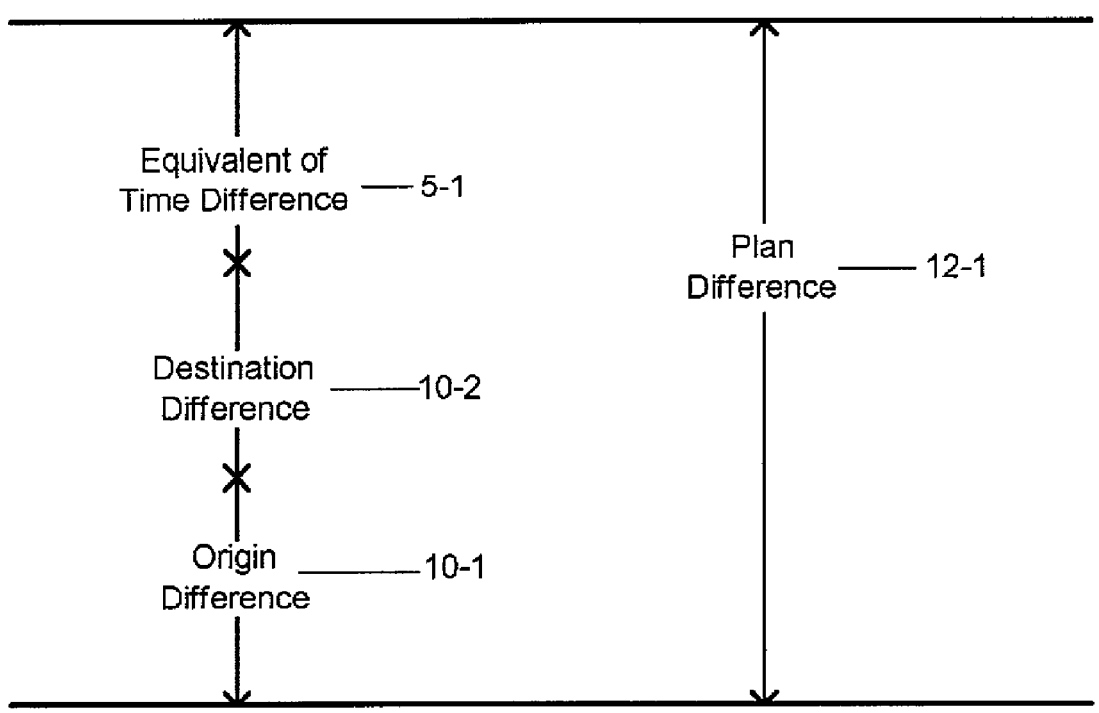
FIG. 12. Illustrates that the quantitative difference between two travel plans can be represented as the sum of the origin difference, destination difference, and distance equivalent of the travel time difference.

As illustrated in FIG. 12, the total difference between a pair of plans can be ranked according to the sum of the origin difference 10-1, the destination difference 10-2, and the distance equivalent of the time difference 5-1; as it is proportional to each of these distances. Other combinations such as the root-mean-square, could also be used.

FIG. 1 is a deployment diagram showing physical parts of the preferred embodiment. Two users 1-1 and 1-3 are shown, each having a personal computer, personal digital assistant (PDA) or other terminal device 1-2 and 1-4 capable of connecting to the Internet 1-5. Although two users are shown, more than two users may use the system. Each user's computer has a Web browser or the equivalent.

The Invention adds a Server Computer 1-6, which also connects to the Internet 1-5. Its software includes a database, typically a relational database supporting the SQL programming language, and Matching System software 1-6a which communicates with the users and with the database.

FIG. 2 shows an embodiment of the screen display that user 1-1, called the Browsing User, encounters. Section 2-1 of the screen display enables the Browsing user to specify the time of his or her travel plan. Section 2-2 enables the Browsing user to specify the origin of the travel plan. In one embodiment of the Invention, this origin is specified as a postal ZIP code, which is converted by the Server Computer 1-6 into the geographic latitude and longitude coordinates of the nearest Post Office. Section 2-3 enables the Browsing user to specify the destination location in a similar way. By activating a Command button 2-4, the Browsing user can request the Server Computer 1-6 to supply a list of the travel plans from the database ranked by match to the Browsing user's specification. Alternatively, by operating a Command Button 2-5 the user may change his or her role from Browsing user to Posting user.

FIG. 3 shows how FIG. 2 is updated after activation of the Command Button 2-4. Section 3-1 is the list of posted travel plans that the Server Computer 1-6 has ranked and ordered by degree of match to the plan specified by the Browsing user.

The Server Computer 1-6 supplies the list 3-6 by computing the Great Circle distance between the requested origin 2-1 and the origins of each travel plan posted in the database, in the manner of marine and aeronautical navigators, for exam pie:

1. Compute the trigonometric sines of both latitudes and multiply them.
2. Compute the trigonometric cosines of both latitudes and multiply them.
3. Subtract one of the longitudes from the other, compute the trigonometric cosine of the result, and multiply the result with the result of the immediately previous step.
4. Compute the trigonometric arc cosine of the sum of the immediately previous step and the first step.
5. If this result is negative, add to it pi radians, the angular distance of a semicircle.
6. Multiply the result of the immediately previous step by the radius of the earth, namely 3,959 miles.

Assuming that the Browsing user's search criteria is stored in a database table called tzSearchCriteria and that the previously posted travel plan proposals are stored in a database table called tPostedTrip , this simplified example Structured Query Language (SQL) computer statement performs the foregoing matching task:

SELECT ProposalID, ProposerID, tzSearchCriteria.UserID, DateDiff("n",WhenS GreatCircleDist(Destination_Latitude, Destination_Longitude, Dest StartMilesDiff+DestMilesDiff+MeetingMilesPerMinute*Abs(MinsDi FROM tzSearchCriteria, tPostedTrip ORDER BY MatchMerit Desc Where the function DateDiff("n", . . . , . . . )

, provided with Microsoft Corp.'s Visual Basic for Applications (VBA) environment, calculates the number of minutes between two specific times; and the function GreatCircleDist( )

is defined in the VBA language as follows:

Const Pi=3.14159265358979
  Public Function GreatCircleDist(pLat1Rad As Double, pdLon1Rad As Dim pDistOnUnitSphere As Double
  pDistOnUnitSphere=ArcCos(Sin(pLat1Rad)* Sin (pLat2Rad)+Cos(pL While pDistonUnitSphere<0
    pDistOnUnitSphere=pDistOnUnitSphere+Pi
  Wend
  Const EarthRadiusMiles=3958.88
  GreatCircleDist=EarthRadiusMiles*pDistOnUnitSphere
  End Function

```
Private Function ArcCos (pdCos As Double)
    Const CloseToZero = 0.0000000000001
    If Abs (1 − pdCos) > CloseToZero Then
        Const PiOver2 = 0.5 * Pi
        ArcCos = Atn (−pdCos / Sqr(1 − pdCos * pdCos)) + PiOver2
    ElseIf pdCos > 0# Then
        ArcCos = 0
    Else
        ArcCos = Pi
    End If
End Function
```

Where the functions

Sin ( )

,

Cos ( )

, and

Atn ( )

, also built into Microsoft's VBA, calculate the trigonometric Sine, Cosine, and Arctangent respectively.

Other computing environments provide equivalent trigonometric functions and could be used as well as the Microsoft VBA environment.

While the foregoing description of the travel plan ranking algorithm serves to convey the basic concept of the Invention, more efficient algorithms that achieve the same results may also be employed.

Next, the Great Circle distance between the requested destination and the destinations of each travel plan posted in the database is computed in a similar way.

Next, the difference between the requested time and the time of each travel plan posted in the database is converted into an equivalent distance by multiplication with an assumed traveling speed. If the result is negative, its absolute value is taken to make it positive.

Next, a rank of the similarity with each travel plan posted in the database is computed as the sum of the foregoing 3 distances, namely origin difference, destination difference, and distance equivalent of time difference.

Next, each travel plan posted in the database is ordered according to this rank.

Finally, this ordered list is transmitted to the Browsing user in list 3-1. A lengthy list may be partitioned into sequentially displayed pages.

Should the Browsing user select a member from the list, that member becomes highlighted as a white-on-black row as illustrated by the second member in the list 3-1, and at the same time a Command Button 3-2 becomes enabled. Should the Browsing user activate Command Button 3-2, a new page is shown as illustrated in FIG. 6.

FIG. 6 illustrates how the details of the plan selected from the list 3-1 might be displayed to the Browsing user. In addition to the basic specifications of time, origin, and destination; contact information for the Posting user and further travel plan details are provided. Section 6-1 shows the time chosen by the Posting user. Section 6-2 illustrates an example of some further details regarding the Poster's personal preferences that might typically be provided. Sections 6-3 and 6-4 show the origin and destination respectively, embellished with further typical details. Section 6-5 provides the contact information for the Posting user so that he or she may be contacted with the purpose of negotiating a ride share agreement.

FIG. 7 is a screen display for the user who has elected to become a Posting user by operating Command Button 2-5. Such an election would typically be made after viewing the list 3-1 and failing to find a satisfactory match. The posted travel plan would consist of data entered onto this screen, in addition to the specifications already given in sections 2-1, 2-2, and 2-3. A Command Button 7-1 enables the Posting user to bring up a display screen to enter or update his or her contact information, typically an email address, telephone number, and/or postal address. Section 7-2 shows a collection of further specifications that might be made available to the Posting user and later displayed to Browsing users in the list 3-1 and/or the display screen of FIG. 6. Selection of a specific Travel Method in Section 7-2 would automatically cause selection of the associated predetermined estimated travel speed for the purpose of converting time differences to distance differences, while failure to select or selection of a nonspecific Travel Method would be equivalent to selection of the most common Travel Method, namely Car, and its associated predetermined estimated travel speed. A Command Button 7-3 enables the Posting user to commit these specifications to the database.

Operation of the Invention

Figure 8:
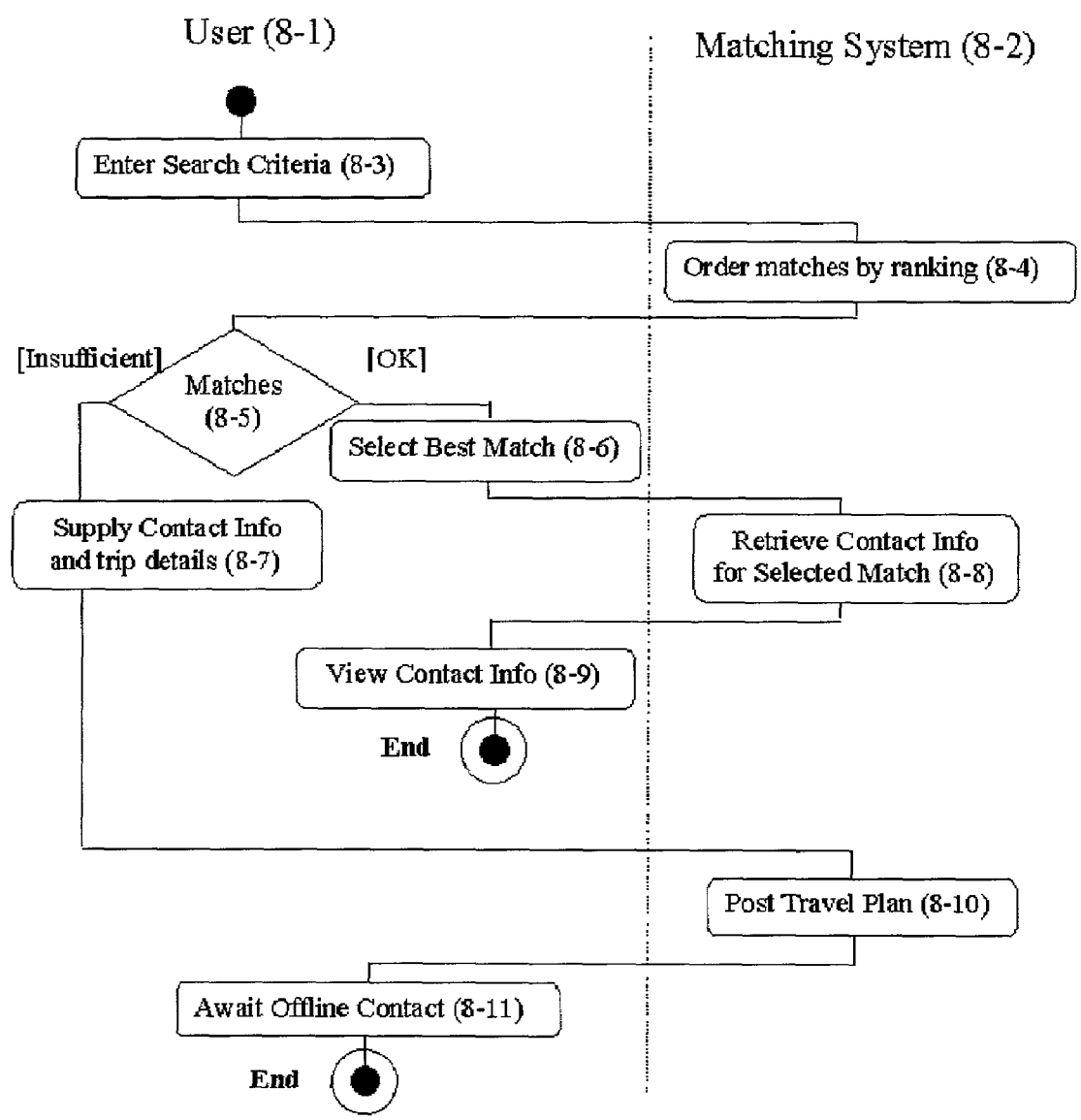
FIG. 8. Is an Activity diagram showing how a user can browse the database and then either select a traveling plan from it, or post a new one to it.

As illustrated in the flow diagram FIG. 8, a User 8-1 typically begins operation by implicitly assuming a Browsing role, and entering search criteria for a proposed travel plan into the system at step 8-3. The screen shown in FIG. 2 is used to complete this step.

The Matching System then calculates the travel plan rankings in step 8-4 and presents them ordered by rank as shown in FIG. 3, list 3-1. A lengthy list may be partitioned into sequentially displayed pages.

In the next step 8-5 the user decides whether any of the displayed travel plans is satisfactory.

Should the user make a selection by operating command button 3-2, all further details regarding the selection, including contact information for the posting user, are retrieved from the database in step 8-8 and displayed in step 8-9 as shown in FIG. 6.

Alternatively, should the user elect to assume the Posting rule by operating command button 2-5, in the next step 8-7 he or she operates command button 7-1, which automatically copies the Browsing origin, destination, and time to a new Posted plan, and then provides further plan details and updates or enters contact information as necessary, using an entry screen like FIG. 7. The posted travel plan is then stored in the database in step 8-10. Thereafter other Browsing users may select this travel plan and contact this Posting user in order to negotiate a ride sharing agreement.

Alternative Embodiments

The preferred embodiment illustrates the use of U.S. postal ZIP codes in order to obtain the geographic coordinates, namely latitude and longitude, of the post offices nearest to an origin and destination.

In an alternative embodiment, the geographic coordinates are obtained more directly and precisely, such as by the methods used by the Web sites www.mapblast.com, www.mapsonus.com, or www.terraserver.com to find such coordinates for arbitrary locations in the U.S. The current proliferation of Global Positioning Satellite (GPS) technology suggests that in future direct use of geographic coordinates will be increasingly convenient.

In another alternative embodiment, the ranking is based upon travel distances measured on maps or virtual maps upon which the origins and destinations have been located. These distances can be measured along roadways according to the methods of Web sites www.mapsonus.com, www.mapblast.com, or http://www.mapquest.com to obtain more accurate travel distance estimates than those from Great Circle calculations, if the travel mode is restricted along roadways.

In another alternative embodiment, additional mandatory filtering criteria can be applied using conventional Boolean logic methods, in conjunction with the ranking process. Plans that do not match such criteria can be filtered from the ranked list. Examples include:

Deadlines: If either the Posting user or the Browsing user specifies that the proposed travel time is a deadline, no travel plans with times later than that proposed are included in the ranked list of matches.

Commuting: If either the Browsing or Posting user specifies that repetitive travel plans at the same time on a plurality of dates are contemplated, only the time of day would be included in the ranking calculations. Such use of the system is functionally equivalent to currently existing commuter ride share systems, except for the absence of limitations on geographic scope. Therefore this embodiment of the Invention can replace the many commuter ride share systems in the prior art, each of which is focused upon a single metropolitan area.

In another alternative embodiment, additional preference criteria can be specified by the Posting user and conveyed to the Browsing user to further inform his or her choice of a plan from the ranked list. Examples include:

Suggested travel mode, such as automobile, airplane, bicycle, hiking, or boat.

Whether the Posting user has a vehicle available. If neither has a vehicle, the option to rent one exists.

Whether the Posting user is able and willing to perform driving chores, and/or is willing to allow the other party to drive.

Whether the Posting user smokes and/or can tolerate smoking by companions.

In another alternative embodiment, Users without Internet access but with a telephone might call a central operator having an Internet connection who acts as the user's proxy or agent.

Theory of Operation

This Invention makes use of the fact that automatic processing of location data is facilitated when that data is in numerical instead of textual form. For example if the latitude and longitude of a location is given instead its city, state, and street address; the task of measuring distances to other similarly specified locations is greatly simplified.

This Invention further utilizes the principles that:

1. The three most significant elements of a travel plan are comprised of the origin, the destination and the travel time.

2. The difference in times between two travel plans can be expressed as an equivalent distance by multiplication with a conversion factor, namely the speed at which a traveler may rendezvous with a traveling companion.

3. By combining the foregoing two principles a single scalar number such as the sum of the equivalent distance between the times, the distance between the origins, and the distance between the destinations can be calculated as a ranking of the similarity between a pair of travel plans.

4. This ranking method overcomes the failure of the prior art's selection methods to recognize potential matches because of naming peculiarities, intervening political boundaries, or other irrelevant factors.

This invention synergistically combines the advantages of an automated ranking process on the one hand, with a manual selection and user control process on the other hand. The automated ranking step rapidly and conveniently narrows a search. Then the manual selection step not only enables the Browsing user to ignore small ranking inaccuracies due, for example, to an imprecise estimate of the travel speed used for converting time differences to distance distances, but also enables the consideration of further selection criteria. This combination of automated ranking and manual selection has been successful for Internet Web Search services such as Yahoo and Google, but has not been available in the context of ridesharing.

CONCLUSION, RAMIFICATIONS, AND SCOPE

This Invention provides an extremely flexible ride share matching method that can approximately match "anywhere, anytime" travel plans, by use of quantitative rather than descriptive or coded specifications.

While my above description contains many specificities, these should not be construed as limitations on the scope of the invention, but rather as an exemplifications thereof. Many other variations are possible. For example:

Alternative purposes for ride sharing, such as touring or social companionship.

Arranging for transport of vehicles or parcels as well as, or instead of, passengers.

Arranging for pickup or drop-off of passengers or cargo at intermediate travel points in addition to the origin and destination.

Arranging for the chaining of trips together such that the destination of one trip matches the origin of another. A special case is the round trip, where the first origin and the final destination coincide.

Accordingly, the scope of the invention should be determined not by the embodiments illustrated, but by the appended claims and their legal equivalents.

What is claimed is:

1. A method for enabling contact among travelers with similar travel plans, comprising:
    soliciting available travel plans from a multitude of Posting travelers,
    quantitatively characterizing each of said available travel plans' origins and destinations by their numerical latitudes and longitudes,
    posting said quantitatively characterized available plans to a data base,
    further soliciting from each said Posting traveler and posting to said database, sufficient contact information to establish communications with said Posting traveler,
    further soliciting from each said Posting traveler and posting to said database in predefined coded and Boolean formats such further compatibility criteria characterizing said Posting traveler and further travel plans as said Posting traveler desires,
    further soliciting from each said Posting traveler and posting to said database such descriptive information characterizing said Posting traveler and further travel plans as said Posting traveler desires,
    soliciting a desired travel plan from a Browsing traveler, quantitatively characterizing the origin and destination, of said desired travel plan by their numerical latitudes and longitudes,
    further soliciting from said Browsing traveler, in said predefined coded and Boolean formats, such further compatibility criteria characterizing the Browsing traveler and further travel plans as said Browsing traveler desires,
    preselecting from said database those of said available plans that are logically compatible with said Browsing traveler's compatibility criteria and said Posting traveler's compatibility criteria,
    calculating a scalar origin difference as the absolute magnitude of the distance between said desired origin and each said available origin in said database,
    calculating a scalar destination difference as the absolute magnitude of the distance between said desired destination and each said available destination in said database,
    calculating a rank of the similarity between said desired plan and each of said preselected plans as a mathematical combination selected from the group consisting of the sum and the root mean square of said origin difference and said destination difference
    ordering said preselected plans according to said rank,
    presenting said ordered plans together with said respective descriptions to said Browsing traveler,
    enabling said Browsing traveler to choose a plan from said presented plans, and
    presenting to said Browsing traveler said contact information sufficient to establish communication with said Posting traveler associated with said chosen plan,
    whereby travelers with similar travel plans can discover each other, and whereby the amount of information required to characterize said travel plans is reduced to a bare minimum, and
    whereby said quantitative characterizations of said origins and said destinations can be obtained from external sources including published data and Global Positioning Satellite Systems, and
    whereby said Browsing travelers can automatically and quickly scan a multitude of travel plans, and
    whereby said Browsing travelers can spontaneously consider ad-hoc choice criteria while reviewing said descriptive information as part of said presentation, and
    whereby said Browsing travelers can exercise explicit control over said final choice process, and are not constrained to accept the putative optimal choice of said ordering according to said rank.

2. The method of claim 1 wherein:
    one or both of said origins and said destinations, of said available travel plans and said desired travel plan, are quantitatively approximated by the numerical latitudes and longitudes of their associated postal codes,
    whereby said Posting travelers and said Browsing travelers can conveniently and easily specify said quantitative characterizations of said origins and said destinations.

3. The method of claim 1 further including:
    quantitatively characterizing the time of occurrence of each of said preselected travel plans,
    quantitatively characterizing the time of occurrence of said desired travel plan,
    calculating a scalar time difference as the absolute magnitude of the difference between said desired travel plan time of occurrence and each said preselected travel plan time of occurrence,
    predetermining a plurality of anticipated travel modes and vehicle types,
    predetermining a numerical conversion factor equal to an estimate of the average speed of each of said plurality of travel modes and vehicle types,
    further soliciting within said solicitation of each of said available travel plans from said multitude of said Posting travelers, a selection of travel method or vehicle type from said plurality of anticipated travel modes and vehicle types,
    converting each said scalar time difference into an equivalent scalar meeting distance by multiplying with said predetermined numerical conversion factor associated with said selected travel method or vehicle type, and
    calculating said rank of the similarity between said desired plan and each of said available plans as a mathematical combination selected from the group consisting of the sum and the root mean square of said origin difference, said destination difference, and said meeting distance respectively, whereby said ordering of said presented plans further accounts for said scalar time differences and reflects the relative merits of said presented plans as perceived by said Browsing traveler.

4. The method of claim 3 further including:
predetermining a default travel method and vehicle type selected from the group consisting of said plurality of anticipated travel modes and vehicle types, as the one estimated most likely to be used, and
substituting said predetermined numerical conversion factor associated with said default travel method and vehicle type, for any unavailable numerical conversion factor due to lack of response to said solicitation of said selection of travel method or vehicle type,
whereby said calculation of said rank is not obstructed by said lack of response.

5. A method for enabling contact among travelers with similar travel plans, comprising:
soliciting available travel plans from a multitude of Posting travelers,
determining the coordinates of the origins and destinations of each of said plans on a geographical map,
posting said available plans including said coordinates to a database,
further soliciting from each said Posting traveler and posting to said database, sufficient contact information to establish communications with said Posting traveler,
further soliciting from each said Posting traveler and posting to said database in predefined coded and Boolean formats such further compatibility criteria characterizing said Posting traveler and further travel plans as said Posting traveler desires,
further soliciting from each said Posting traveler and posting to said database such descriptive information characterizing said Posting traveler and further travel plans as said Posting traveler desires,
soliciting a desired travel plan from a Browsing traveler,
further soliciting from said Browsing traveler, in said predefined coded and Boolean formats, such further compatibility criteria characterizing the Browsing traveler and further travel plans as said Browsing traveler desires,
preselecting from said database those of said available plans that are logically compatible with said Browsing traveler's compatibility criteria and said Posting traveler's compatibility criteria,
determining the coordinates of the origins and destinations of said desired plan on a map
calculating a scalar origin difference as the absolute magnitude of the distance measured on said map between said desired origin and each said preselected origin,
calculating a scalar destination difference as the absolute magnitude of the distance measured on said map between said desired destination and each said preselected destination,
calculating a rank of the similarity between said desired plan and each of said preselected plans as a combination selected from the group consisting of the sum and the root mean square of said origin difference and said destination difference,
ordering said preselected plans from said database according to said rank,
presenting said ordered plans together with said respective descriptions to said Browsing traveler,
enabling said Browsing traveler to choose a plan from said presented plans, and
presenting to said Browsing traveler said contact information sufficient to establish communication with said Posting traveler associated with said chosen plan.

6. The method of claim 5 further including:
quantitatively characterizing the time of occurrence of each of said preselected travel plans,
quantitatively characterizing the time of occurrence of said desired travel plan,
calculating a scalar time difference as the absolute magnitude of the difference between said desired travel plan time of occurrence and each said preselected travel plan time of occurrence,
predetermining a plurality of anticipated travel modes and vehicle types,
predetermining a numerical conversion factor equal to an estimate of the average speed of each of said travel modes and vehicle types,
further soliciting within said solicitation of each of said available travel plans from said multitude of said Posting travelers, a selection of travel method or vehicle type from said plurality of anticipated travel modes and vehicle types,
converting each said scalar time difference into an equivalent scalar meeting distance by multiplying with said predetermined numerical conversion factor associated with said selected travel method or vehicle type, and
calculating said rank of the similarity between said desired plan and each of said available plans as a mathematical combination selected from the group consisting of the sum and the root mean square of said origin difference, said destination difference, and said meeting distance respectively.

7. The method of claim 6 further including:
predetermining a default travel method and vehicle type selected from the group consisting of said plurality of anticipated travel modes and vehicle types, as the one estimated most likely to be used, and
substituting said predetermined numerical conversion factor associated with said default travel method and vehicle type, for any unavailable numerical conversion factor due to lack of response to said solicitation of said selection of travel method or vehicle type.

* * * * *